(12) United States Patent
Frisinger

(10) Patent No.: US 8,907,969 B2
(45) Date of Patent: Dec. 9, 2014

(54) PARTIALLY RESIDENT TEXTURES

(75) Inventor: Tom Frisinger, Shrewsbury, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 897 days.

(21) Appl. No.: 13/012,348

(22) Filed: Jan. 24, 2011

(65) Prior Publication Data

US 2012/0147028 A1    Jun. 14, 2012

Related U.S. Application Data

(60) Provisional application No. 61/422,324, filed on Dec. 13, 2010.

(51) Int. Cl.
*G09G 5/00*    (2006.01)
(52) U.S. Cl.
CPC ....................................... *G09G 5/00* (2013.01)
USPC ............................ 345/587; 345/581; 345/582
(58) Field of Classification Search
CPC .............. G09G 5/00; G09G 2360/121; G09G 2360/122; G09G 5/363; G09G 2340/0407; G09G 5/02; G09G 2330/021; G09G 2330/022; G09G 2360/08; G09G 2370/022; G09G 2370/04; G06T 15/04; G06T 2210/36; G06T 7/40
USPC .......................................... 345/581, 582, 587
See application file for complete search history.

(56) References Cited

U.S. PATENT DOCUMENTS

2008/0079744 A1* 4/2008 Xu et al. ........................ 345/552
2010/0182323 A1* 7/2010 Nuydens ....................... 345/441
2011/0157206 A1* 6/2011 Duluk et al. .................. 345/582
2012/0038657 A1* 2/2012 Grossman et al. ............ 345/585

OTHER PUBLICATIONS

Mittring, M., "Advanced Virtual Texture Topics," Chapter 2 in *Advances in Real-Time Rendering in 3D Graphics and Games Course—SIGGRAPH 2008*, Tatarchuk, N. (Ed.), pp. 23-51, Crytek GmbH (2008).
van Waveren, J.M.P., "Virtual Texturing with DirectX 9 Class Hardware," id Software, 32 pgs., Id Software LCC (Aug. 2009).

* cited by examiner

*Primary Examiner* — Ke Xiao
*Assistant Examiner* — Kim-Thanh T Tran
(74) *Attorney, Agent, or Firm* — Volpe and Koenig, P.C.

(57) ABSTRACT

A method, computer program product, and system are provided for processing a graphics operation. For instance, the method can include partitioning a texture and associated mipmaps into memory tiles, where the memory tiles are associated with a virtual memory system. The method can also include mapping a first subset of the memory tiles to respective address spaces in a physical memory system. Further, the method can include accessing the physical memory system during a rendering process of a graphics scene associated with the first subset of memory tiles. In the instance when the graphics scene requires one or more memory tiles outside of the first subset of memory tiles, the method can also include mapping a second subset of memory tiles to respective address spaces in the physical memory system.

22 Claims, 6 Drawing Sheets

PARTIALLY RESIDENT TEXTURES

CROSS REFERENCE TO RELATED APPLICATIONS

This application claims the benefit of U.S. Provisional Application No. 61/422,324, filed Dec. 13, 2010, which is herein incorporated by reference.

BACKGROUND

1. Field

Embodiments of the present invention generally relate to texture mapping.

2. Background

Texture mapping refers to a method for adding detail, surface texture, or color to a computer-generated graphic or three-dimensional model. When rendering computer-generated graphics, one or more textures can be applied (or mapped) to each geometric primitive of the graphic. These textures contain, for example, color and luminance data to be mapped to each of the geometric primitives.

A challenge in texture mapping, among others, is the storage and management of textures and associated mipmaps. Mipmaps are pre-calculated, optimized collections of images that accompany a texture in video memory. Typically, prior to rendering a graphics scene, all textures and associated mipmaps for the scene must be resident in video memory. This is the case even when the scene requires access to a fraction or portion of the textures and associated mipmaps. If the video memory cannot store all of the textures and associated mipmaps for the scene, the size, resolution, and level of detail for the textures and mipmaps are oftentimes reduced due to video memory constraints, thus compromising the quality of the rendered graphics scene. In addition, an inefficient use of video memory can result from the unnecessary storage of textures and mipmaps that are not used in the rendered graphics scene.

Methods and systems are needed to address the aforementioned disadvantages resulting from the typical usage of video memory during the texture mapping process.

SUMMARY OF EMBODIMENTS

Embodiments of the present invention include a method for texture mapping. The method can include partitioning a texture and associated mipmaps into memory tiles, where the memory tiles are associated with a virtual memory system. The size of each of the memory tiles can be based on a size of a macro tile (e.g., 64 KB) used in a texture swizzle pattern of a graphics processing unit. The method can also include mapping a first subset of the memory tiles to respective address spaces in a physical memory system. The memory tiles in the first subset of memory tiles can include one or more memory tiles that correspond to mipmaps with a predetermined level of detail (e.g., lowest level of detail in a mipmap chain). The method can further include accessing the physical memory system during a rendering process of a graphics scene associated with the first subset of memory tiles. In the instance when the graphics scene requires one or more memory tiles outside of the first subset of memory tiles, the method can also include mapping a second subset of memory tiles to respective address spaces in the physical memory system. The second subset of memory tiles can include the one or more memory tiles outside of the first subset that is required during the rendering process of the graphics scene.

Embodiments of the present invention additionally include a computer-usable medium having computer program logic recorded thereon that, when executed by one or more processors, performs a texture mapping operation. The computer program logic can include a first computer readable program code that enables a processor to partition a texture and associated mipmaps into memory tiles, where the memory tiles are associated with a virtual memory system. In addition, the computer program logic can include a second computer readable program code that enables a processor to map a first subset of the memory tiles to respective address spaces in a physical memory system. The computer program logic can also include a third computer readable program code that enables a processor to access the physical memory system during a rendering process of a graphics scene associated with the first subset of memory tiles. Further, the computer program logic can include a fourth computer readable program code that enables a processor to map a second subset of memory tiles to respective address spaces in the physical memory system when the rendering process of the graphics scene requires one or more memory tiles outside of the first subset of memory tiles.

Embodiments of the present invention further include a graphics computing system. The graphics computing system can include an application module, an application programming interface (API), a processing module, a driver module, and a display module. The processing module can be configured to partition a texture and associated mipmaps into memory tiles, where the memory tiles are associated with a virtual memory system. The processing module can also be configured to map a first subset of the memory tiles to respective address spaces in a physical memory system. The processing module can also be configured to access the physical memory system during a rendering process of a graphics scene associated with the first subset of memory tiles. Further, the processing module can be configured to map a second subset of memory tiles to respective address spaces in the physical memory system when the rendering process of the graphics scene requires one or more memory tiles outside of the first subset of memory tiles.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Thus, the operational behavior of embodiments of the present invention will be described with the understanding that modifications and variations of the embodiments are possible, given the level of detail presented herein.

Figure 1:
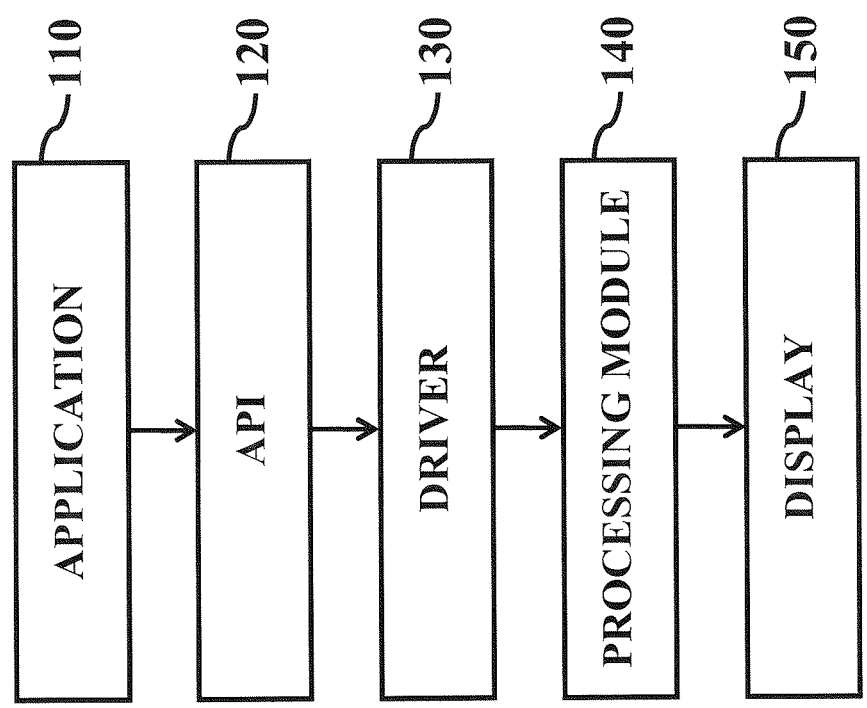
FIG. 1 is an illustration of a graphics processing system in which embodiments of the present invention can be implemented.

FIG. 1 is an illustration of a graphics processing system 100 in which embodiments of the present invention can be implemented. Graphics processing system 100 includes an application module 110, an application programming interface (API) 120, a driver module 130, a processing module 140, and a display module 150. Application module 110 can be an end-user application that requires graphics processing such as, for example and without limitation, a video game application. API 120 is configured to serve as an intermediary between application module 110 and driver module 130, according to an embodiment of the present invention. In particular, API 120 can allow a wide range of common graphics functions to be written by software developers such that the graphics functions operate on many different hardware systems (e.g., processing module 140). Examples of API 120 include, but are not limited to, DirectX (from Microsoft) and OpenGL (from Silicon Graphics).

Figure 2:
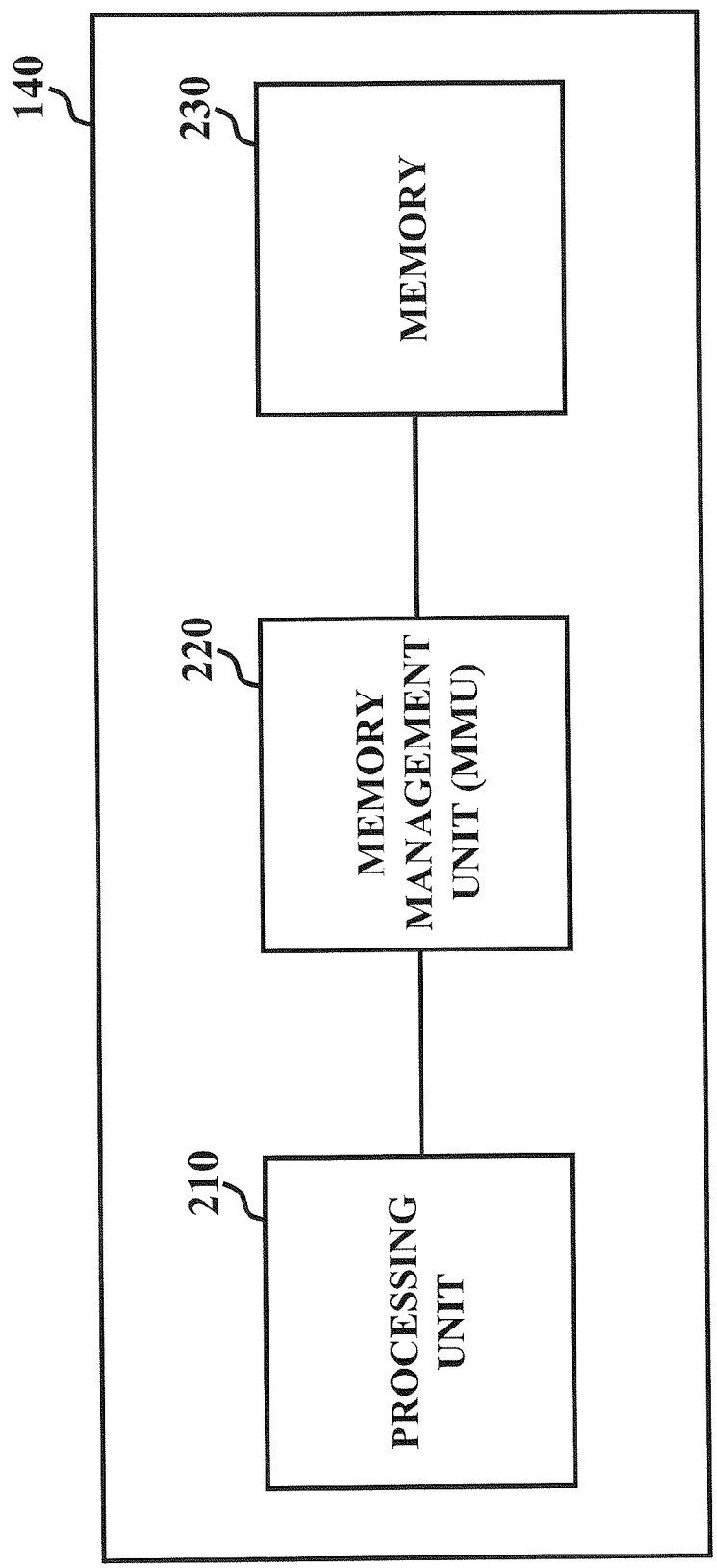
FIG. 2 is an illustration of an embodiment of a processing module that can be implemented in a graphics processing system.

FIG. 2 is an illustration of an embodiment of processing module 140. Processing module 140 includes a processing unit 210, a memory management unit (MMU) 220, and a memory device 230. Processing unit 210 can be, for example and without limitation, a central processing unit (CPU), a graphics processing unit (GPU), an application-specific integrated circuit (ASIC) controller, or other similar types or combinations thereof of processing units. Processing unit 210 is configured to execute instructions and to carry out operations associated with graphics processing system 100 of FIG. 1. For instance, graphics processing system 100 can be configured to render and display graphics. MMU 220 is configured to handle accesses to memory device 230 requested by processing unit 210. The functions of MMU 220 include, for example and without limitation, translation of virtual addresses to physical addresses (e.g., virtual memory management), cache control, and bus arbitration. The functions of MMU 220 will be described in further detail below with respect to FIGS. 3 and 4. Memory device 230 can be, for example and without limitation, a random access memory device (e.g., Dynamic Random Access Memory, Static Random Access Memory, etc.), a Flash memory device, or other similar types of memory devices.

With respect to graphics processing system 100 of FIG. 1, display module 150 can be, for example and without limitation, a cathode ray tube display, a liquid crystal display, a light emitting diode display, or other similar types of display devices.

A goal, among others, of the embodiments described herein is to improve the storage and management of textures and associated mipmaps during a texture mapping operation performed by graphics processing system 100 of FIG. 1. Typically, prior to rendering a graphics scene, all of the textures and associated mipmaps for the scene must be resident in video memory (e.g., memory device 230 of FIG. 2). If the video memory is unable store all of the textures and associated mipmaps for the scene, the size, resolution, and level of detail for the textures and associated mipmaps may need to be reduced, thus compromising the quality of the rendered image. As described in further detail below, embodiments of the present invention address this issue by only requiring a portion of the textures and associated mipmaps (also referred to herein as a "partially resident texture") to be resident in video memory in order to improve performance in graphics processing system 100.

With respect to graphics processing system 100 of FIG. 1, driver module 130 is a computer program that allows a higher-level graphics computing program, from application module 110, to interact with processing module 140, according to an embodiment of the present invention. For instance, driver module 130 can be written by a manufacturer of processing module 140 to translate standard code received from API 120 into a native format understood by processing unit 210 of FIG. 2 (which is included in processing module 140). Driver module 130 allows input from, for example and without limitation, application module 110 or a user to direct settings of processing module 140. Such settings include selection of an anti-aliasing control, a texture filter control, and a mipmap detail control. For example, a user can select one or more of these settings via a user interface (UI), including a UI supplied to the user with graphics processing hardware and software.

In reference to FIG. 1, driver module 130 issues commands to processing module 140. In an embodiment, driver module 130 receives a graphics operation from application module 110 via API 120. The graphics operations can include, for example and without limitation, texture mapping of a graphics scene. As would be understood by a person skilled in the relevant art, during a texture mapping operation, a texture and associated mipmaps are used to add detail, surface texture, or color to the graphics scene.

In an embodiment, processing module 140 is configured to partition a texture and its associated mipmaps into memory tiles. The memory tiles are predetermined address spaces in a virtual memory system managed by MMU 220 of FIG. 2 (which is included in processing module 140). In an embodiment, the memory size of each of the memory tiles is based on a macro tile size used in a texture swizzle pattern of processing unit 210 of FIG. 2 (e.g., GPU). That is, as would be understood by a person skilled in the relevant art, textures are oftentimes stored in video memory (e.g., memory device 230 of FIG. 2) in a swizzled format to bring spatially close texels closer to each other in memory, thus speeding up typical memory access patterns. In an embodiment, the memory tile size can be the same as the macro tile size (e.g., a 64 KB macro tile). However, based on the description herein, a person skilled in the relevant art will recognize that other memory tile sizes can be used.

Figure 3:
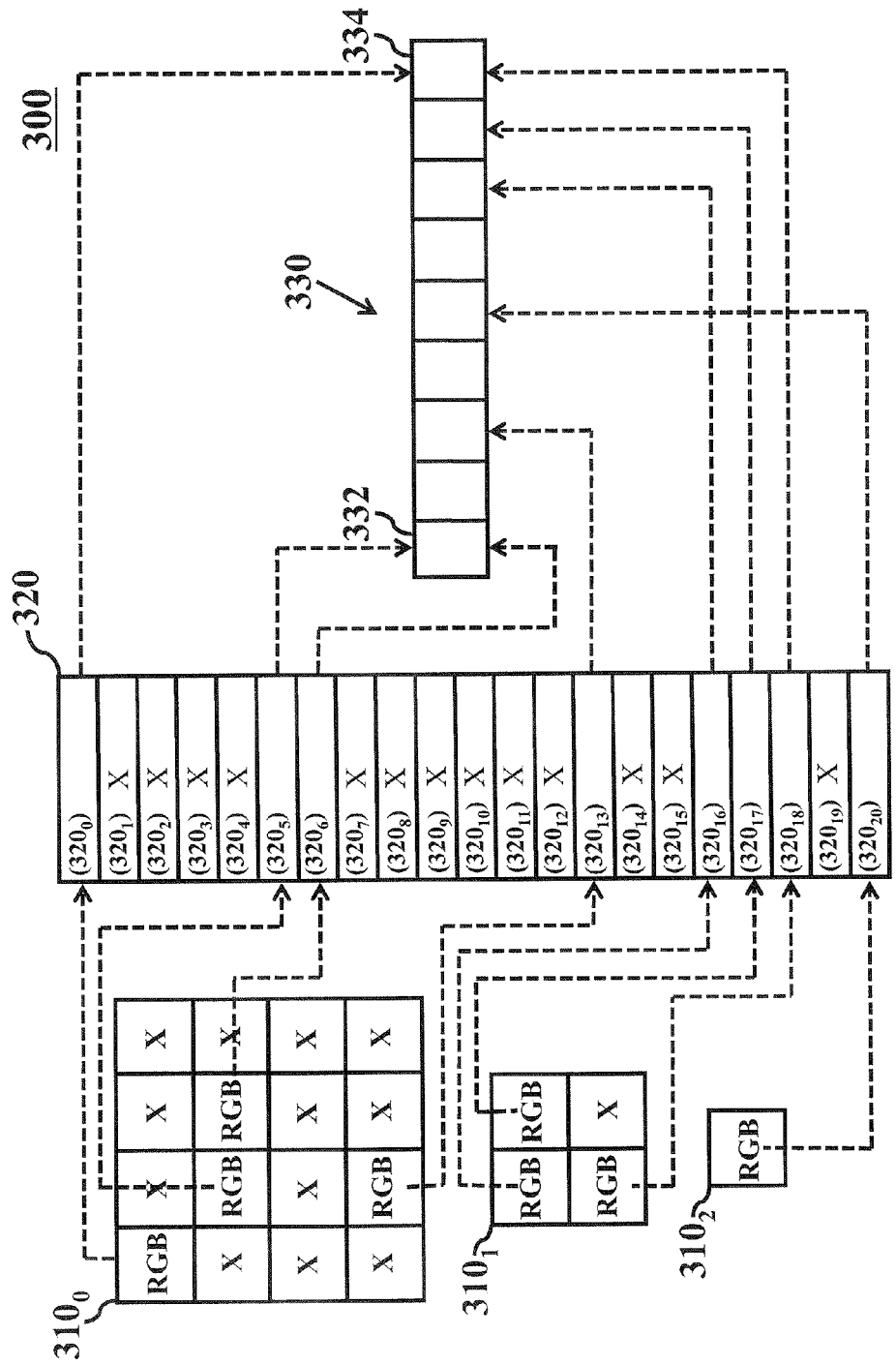
FIG. 3 is an illustration of an example texture mapping scheme in accordance with embodiments of the present invention.

FIG. 3 is an illustration of an example texture mapping scheme 300 in accordance with embodiments of the present invention. Texture mapping scheme 300 includes mipmaps $310_0$-$310_2$, a virtual memory 320, and a physical memory 330

(e.g., memory device 230 of FIG. 2). Mipmap $310_0$ represents a level of detail (LOD) for a texture. Mipmap $310_1$ is a filtered version of mipmap $310_0$ and represents a lower (e.g., less detailed) LOD than the LOD for mipmap $310_0$ for the texture. Similarly, mipmap $310_2$ is a filtered version of mipmap $310_1$ and represents a lower (e.g., less detailed) LOD than the LOD for mipmap $310_1$ for the texture. Mipmaps and the LOD associated with each of the mipmaps are known to a person skilled in the relevant art.

In an embodiment, processing unit 210 of FIG. 2 can be used to partition mipmaps $310_0$-$310_2$ into memory tiles. Each of mipmaps $310_0$-$310_2$ is partitioned into memory tiles (of the same size), in which mipmap $310_2$ is represented by a single memory tile and represents the lowest (e.g., least detailed) LOD in the mipmap chain $310_0$-$310_2$. Each of the memory tiles contains texel information for its respective mipmap. Although only three mipmaps are depicted in FIG. 3, a person skilled in the relevant art would understand that mipmap chain $310_0$-$310_2$ is for exemplary and explanation purposes, and that the mipmap chain can include more mipmaps (and thus providing a higher LOD) or less mipmaps than the three mipmaps depicted in texture mapping scheme 300 of FIG. 3. Further, based on the description herein, a person skilled in the relevant art will recognize that the embodiments described herein are equally applicable to one- and three-dimensional textures, as well as arrays of various textures. In an embodiment, if mipmaps $310_0$-$310_2$ are smaller (in size) than a single memory tile, then one or more of mipmaps $310_0$-$310_2$ can be loaded into the single memory tile in order to conserve memory resources.

In an embodiment, each of the memory tiles is associated with a respective address space in a page table of virtual memory 320. For instance, in reference to FIG. 3, the memory tile associated with the top-left corner of mipmap $310_0$ (labeled "RGB") is associated with an address space $320_0$ in the page table of virtual memory 320 (indicated by a dashed line with an arrow). The memory tile to the immediate right of the top-left corner memory tile of mipmap $310_1$ (labeled "X") is associated with an address space $320_1$ in the page table of virtual memory 320. In an embodiment, if two or more contiguous page table entries are small in size (e.g., one or more mipmaps $310_0$-$310_2$ can be loaded into a single memory tile), then the two or more page table entries can be mapped to a single address space in page table of virtual memory 320.

In a raster-like fashion (e.g., traversal from left to right, traversal down, and then traversal from left to right), each of the memory tiles from mipmaps $310_0$-$310_2$ is associated with a respective address space $320_0$-$320_{20}$ in the page table of virtual memory 320. The depicted association of the partitioned memory tiles of mipmaps $310_0$-$310_2$ to the page table of virtual memory 320 in FIG. 3 is for explanation and exemplary purposes. Based on the description herein, a person skilled in the relevant art will recognize that other schemes are available to associate the memory tiles of mipmaps $310_0$-$310_2$ to virtual memory 320. Also, the dashed lines with arrows in FIG. 3 indicate which of the memory tiles from mipmaps $310_0$-$310_2$ are mapped to respective address spaces in physical memory 330. This will be described in further detail below.

After mipmaps $310_0$-$310_2$ are partitioned into memory tiles, MMU 220 of FIG. 2 maps a first subset of the memory tiles to respective address spaces in physical memory 330 of FIG. 3 (e.g., memory device 230 of FIG. 2). The selection of memory tiles in the first subset of memory tiles to be mapped to physical memory 330 is provided by application module 110 of FIG. 1, according to an embodiment of the present invention. In an embodiment, the memory tile selection information can be based on the following factors: memory tiles that application module 110 anticipates will be needed in the texture mapping operation; and, a predetermined LOD of a mipmap and one or more memory tiles associated with that mipmap. That is, in an effort to reduce physical memory consumption, application module 110 may provide instructions to processing module 140 of FIG. 1 to make resident particular memory tiles associated with a mipmap chain.

For instance, in reference to FIG. 3, application module 110 may instruct processing module 140 the following: to make resident the memory tile associated with mipmap $310_2$ (which has the lowest, or least detailed, LOD in the mipmap chain); to make resident a majority of the memory tiles associated with mipmap $310_1$ (the mipmap with the next highest LOD with respect to mipmap $310_2$); and, to make resident a minority of the memory tiles associated with mipmap $310_0$ (which has the highest, or most detailed, LOD in the mipmap chain). As a result of this mapping scheme, an optimization of physical memory space allocated to the texture mapping process can be realized, thus allowing more physical memory space for memory tiles with a higher (e.g., more detailed) LOD to be resident in video memory.

In reference to FIG. 3, the selection of the first subset of memory tiles to be mapped to physical memory 330 is indicated by memory tiles labeled "RGB" in the mipmap chain $310_0$-$310_2$. These selected memory tiles are associated with respective address spaces in virtual memory 320 (e.g., address spaces $320_0$, $320_5$, $320_6$, $320_{13}$, $320_{16-18}$, and $320_{20}$), which are mapped to respective address spaces in physical memory 330. With respect to the memory tiles from mipmaps $310_0$-$310_2$ that are not selected in the first subset of memory tiles (e.g., address spaces $320_{1-4}$, $320_{7-12}$, $320_{14}$, $320_{15}$, and $320_{19}$ from virtual memory 320), these memory tiles are marked as invalid (memory tiles labeled "X" in FIG. 3) and are not mapped to physical memory 330.

With respect to the first subset of memory tiles mapped to physical memory 330, these memory tiles can share the same texture information, according to an embodiment of the present invention. In particular, address spaces in the page table of virtual memory 320 can be mapped to the same address space in physical memory 330. For instance, address spaces $320_5$ and $320_6$ in the page table of virtual memory 320 are mapped to an address space 332 in physical memory 330. Similarly, address spaces $320_0$ and $320_{18}$ in the page table of virtual memory 320 are mapped to an address space 334 in physical memory 330.

Once the first subset of memory tiles have been mapped to physical memory 330 (i.e., resident in physical memory 330), application module 110 of FIG. 1 can access this information (e.g., via API 120 and driver module 130) during a texture mapping operation. The storage of portions of the texture and associated mipmaps is also referred to herein as a "partially resident texture" because, in contrast to a typical texture mapping operation, only a portion of the texture and associated mipmaps are required to be resident in video memory for the texture mapping operation.

In an embodiment, in response to a texture sampling instruction from application module 110 to processing module 140 of FIG. 1, processing module 140 can return a status code to application module 110. The status code, in an embodiment, can indicate the following: a successful fetch of texture information requested by application module 110; or, a failure in the fetch of texture information requested by application module 110. The failure in the fetch of texture information can be the result of an attempt to access information from a mipmap with a higher (e.g., more detailed) LOD than a mipmap currently resident in video memory. Alternatively, the failure can also be the result of an attempt to access a non-resident memory tile associated with a mipmap that has one or more of its memory tiles currently resident in video memory. For instance, in reference to FIG. 3, memory tiles labeled as "X" from mipmap $310_0$ are non-resident memory tiles associated with a mipmap that has one or more of its memory tiles currently resident in video memory (e.g., memory tiles labeled as "RGB" in mipmap $310_0$).

In the event that a failure status code is returned to application module 110, application module 110 instructs processing module 140 on an action to be taken in response to the failure status code, according to an embodiment of the present invention. In an embodiment, application module 110 can instruct processing module 140 to fetch a memory tile with a LOD that is the "closest" to the memory tile requested by application module 110 in order to execute the current texture sampling instruction, according to an embodiment of the present invention. For instance, processing unit 210 of FIG. 2 (included in processing module 140) can assess the texture information requested by application module 140 and determine whether a resident memory tile contains similar texture information (e.g., memory tile with similar texture information, but at a lower LOD). If so, the texture information from the memory tile resident in video memory is used in the texture mapping operation. In the alternative, according to an embodiment of the present invention, application module 110 can instruct processing module 140 to apply a predetermined default value or default memory tile. In an embodiment, processing module 140 can automatically fetch the "closest" or the default memory tile in response to receipt of the failure status code by application module 140 (e.g., without application module 110 instructing processing module 140 to perform the operation), according to an embodiment of the present invention.

After an action is taken in response to the failure status code (e.g., a fetch of the "closest" or the default memory tile), application module 110 is informed of which memory tiles failed and then decides whether one or more memory tiles should be loaded next, according to an embodiment, of the present invention. In an embodiment, application module 110 instructs processing module 140 to map a second subset of memory tiles to respective address spaces in physical memory 330 of FIG. 3, according to an embodiment of the present invention. The second subset of memory tiles corresponds to one or more memory tiles that are not currently resident in video memory. For instance, these non-resident memory tiles can correspond to mipmaps with a higher LOD than the mipmaps associated with the currently resident memory tiles. Alternatively, the non-resident memory tiles can correspond to other memory tiles associated with a mipmap that has one or more of its memory tiles already mapped to physical memory (e.g., memory tiles labeled as "RGB" in mipmap $310_0$).

In addition to indicating that a failure has occurred, the status code can also provide information regarding the LOD attempted to be accessed by application module 110. With this LOD information, application module 110 can assess the LOD frequently requested by application module 110, as well as the LOD that is not frequently requested by application module 110. In turn, application module 110 can provide instructions to processing module 140 to load memory tiles associated with those frequently requested LOD and to unload memory tiles that are not frequently requested by application module 110. For instance, if non-resident memory tiles with a higher (e.g., more detailed) LOD than currently resident memory tiles are frequently requested by application module 110, processing module 140 can map these frequently requested memory tiles to physical memory (e.g., physical memory 330 of FIG. 3) and unmap currently resident memory tiles that are less frequently requested by application module 110. A benefit, among others, of this LOD assessment by application module 110 is the optimization of video memory allocated to the texture mapping process. In addition, this optimization can be performed in an adaptive manner based on the status code information (e.g., LOD information) provided by processing module 140 to application module 110.

In addition to the embodiments described above, the following discussion describes two features of graphics processing system 100 of FIG. 1 that can be used to optimize the texture mapping operation. First, in an embodiment, application module 110 can instruct processing module 140 to implement a maximum (e.g., most detailed) LOD clamp. The maximum LOD clamp provides a "ceiling" to the LOD associated with a texture and associated mipmaps that processing module 140 makes resident in video memory. In turn, the maximum LOD clamp also provides a ceiling to the LOD that processing module 140 returns to application module 110 in response to a texture sampling instruction. A benefit, among others, of the maximum LOD clamp is that application module 110 can choose not to load texture information associated with a LOD that is higher (e.g., more detailed) than the LOD associated with texture information resident in video memory, thus providing a savings in physical memory consumption.

Figure 4:
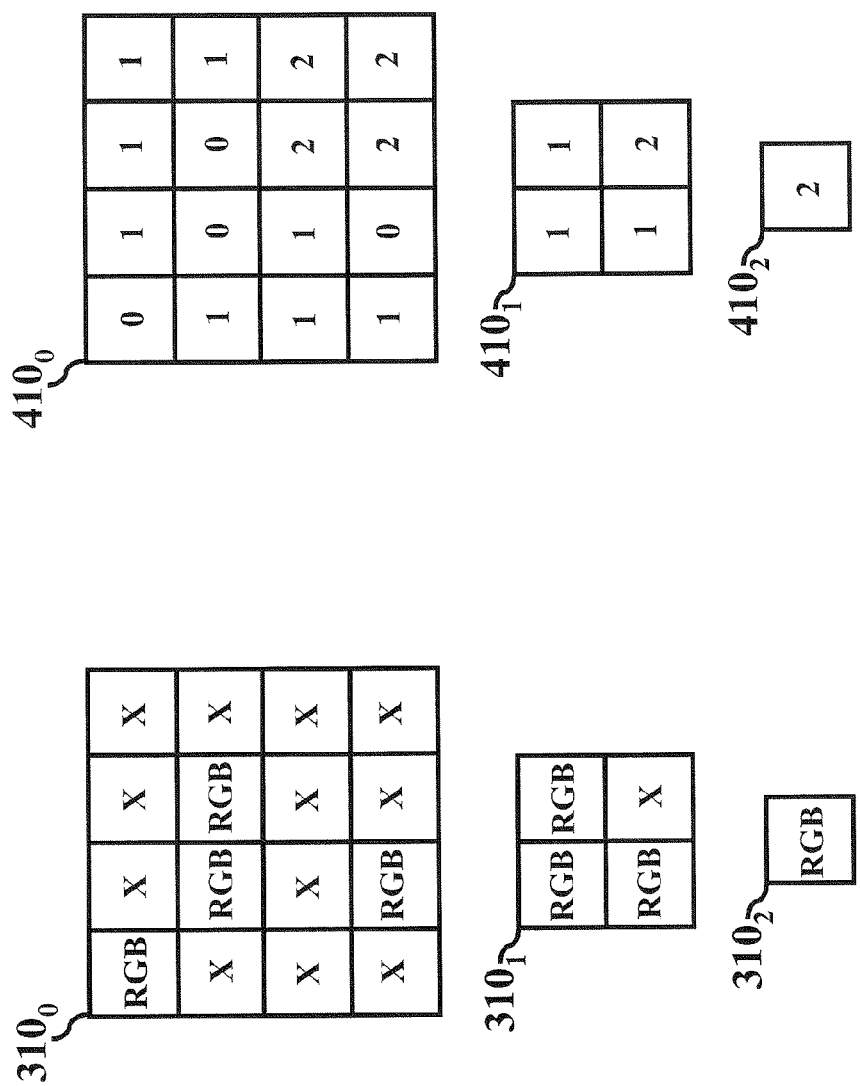
FIG. 4 is an illustration of an embodiment of a level of detail index tables.

Second, in an embodiment, a separate LOD index table is used to track a partially resident texture and its associated mipmaps. FIG. 4 is an illustration of an embodiment of LOD index tables $410_0$-$410_2$ that respectively correspond to mipmaps $310_0$-$310_2$. Index tables $410_0$-$410_2$ provide information on a resident memory tile that corresponds to a memory tile of interest. For instance, with respect to LOD index table $410_0$, the memory tile located in the upper left corner corresponds to the resident memory tile located in the upper left corner of mipmap $310_0$ (labeled "RGB"). For a non-resident memory tile such as, for example, the memory tile located in the upper right corner of mipmap $310_0$ (labeled "X"), memory tile information from lower (e.g., less detailed) LOD mipmap $310_1$ can be used. That is, with respect to LOD index table $410_1$, the memory tile located in the upper right corner (labeled "1") is used to represent one or more memory tiles in the upper right region of index table $410_0$ that do not correspond to resident memory tiles. Based on the description herein, a person skilled in the relevant art will recognize that a similar indexing scheme (as described above) can be applied to index tables $410_1$ and $410_2$. In an embodiment, LOD index tables $410_0$-$410_2$ can be included in processing module 140 of FIG. 1. Alternatively, in an embodiment, LOD index tables $410_0$-$410_2$ can be included in application module 110 of FIG. 1.

In an embodiment, application module 110 of FIG. 1 can track resident texture information via LOD index tables $410_0$-$410_2$. In reference to FIG. 4, application module 110 performs a first texture access on LOD index table $410_0$ to calculate a particular LOD to fetch in the page table of virtual memory 320. Since the entries of LOD index table $410_0$ provide information on textures and associated mipmaps resident in video memory, application module 110 can assess the LOD available for a texture sampling instruction. In turn, application module 110 can issue a texture sampling instruction (clamping access to a particular maximum LOD) that returns texture information from processing module 140. A benefit, among others, of LOD index tables $410_0$-$410_2$ are that they eliminate texture fetch misses from application module 110.

Figure 5:
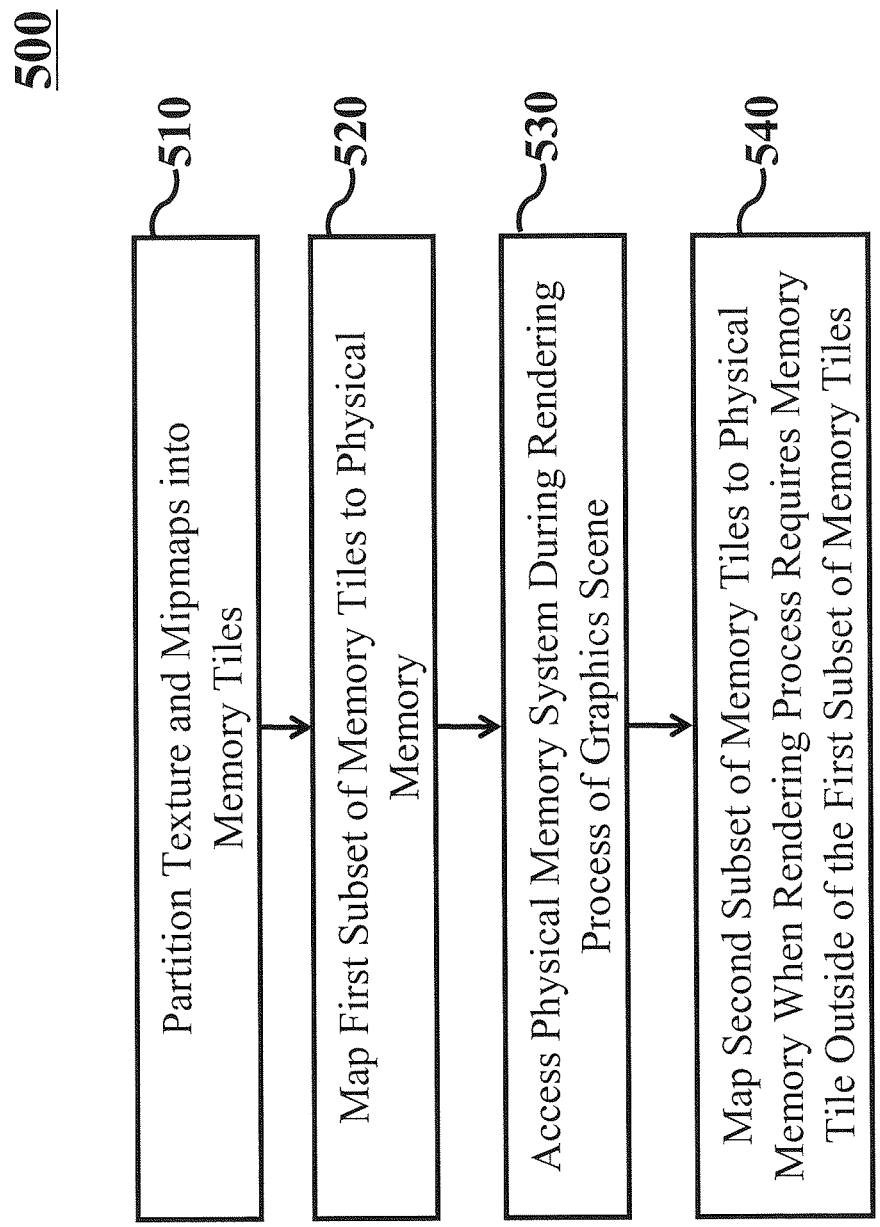
FIG. 5 is an illustration of an embodiment of a method for texture mapping.

FIG. 5 is an illustration of a method 500 for texture mapping. Method 500 can occur using, for example and without limitation, graphics processing system 100 of FIG. 1.

In step 510, a texture and associated mipmaps are partitioned into memory tiles. The memory tiles are associated with respective address spaces of a virtual memory system (e.g., virtual memory 320 of FIG. 3). The texture and its associated mipmaps can be partitioned into a memory tile size that is compatible with a macro tile associated with a texture swizzle pattern of a graphics processing unit. In an embodiment, step 510 can be performed by a memory management unit such as, for example, MMU 220 of FIG. 2.

In step 520, a first subset of memory tiles are mapped to respective address spaces in a physical memory system (e.g., physical memory 330 of FIG. 3). The memory tiles mapped to the respective address spaces in the physical memory system can correspond to mipmaps with a predetermined LOD. The predetermined LOD can be provided by an application such as, for example, application module 110 of FIG. 1. For the memory tiles not included in the first subset of memory tiles, these memory tiles can be marked as invalid in a page table associated with the virtual memory system. In addition, one or more memory tiles from the first subset of memory tiles can be mapped to the same address space in the physical memory system.

In step 530, the physical memory system is accessed during a rendering process of graphics scene associated with the first subset of memory tiles. If the rendering process requires a memory tile that is not resident in video memory, then a failure status code is reported to the application. The failure status code can include information on a LOD associated with an unmapped memory tile attempted to be accessed by the application.

In step 540, a second subset of memory tiles is mapped to respective address spaces in the physical memory system when the rendering process of the graphics scene requires one or more memory tiles outside of the first subset of memory tiles. The one or more memory tiles outside of the first subset of memory tiles can include memory tiles that correspond to mipmaps with a higher (e.g., more detailed) LOD than a LOD associated with mipmaps corresponding to the first subset of memory tiles.

Figure 6:
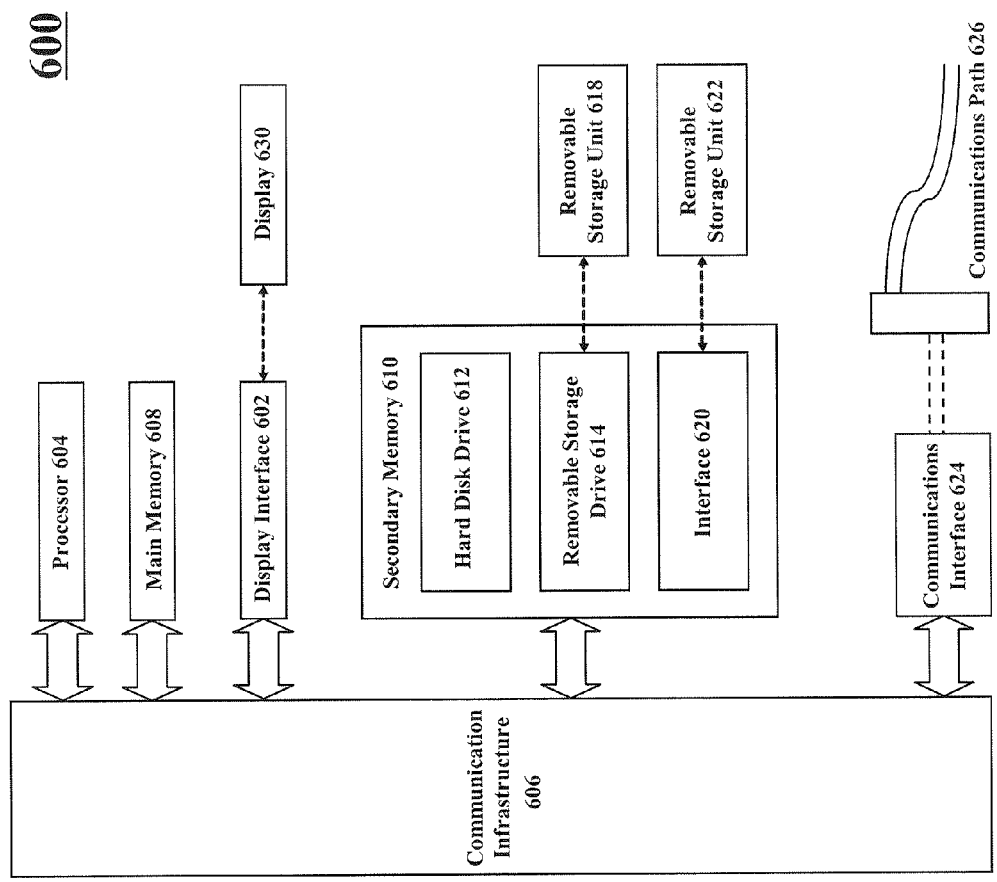
FIG. 6 is an illustration of an example computer system in which embodiments of the present invention can be implemented.

Various aspects of the present invention may be implemented in software, firmware, hardware, or a combination thereof. FIG. 6 is an illustration of an example computer system 600 in which embodiments of the present invention, or portions thereof, can be implemented as computer-readable code. For example, the method illustrated by flowchart 500 of FIG. 5 can be implemented in system 600. Various embodiments of the present invention are described in terms of this example computer system 600. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (such as a GPU core) that is embodied in program code and can be transformed to hardware as part of the production of integrated circuits.

Computer system 600 includes one or more processors, such as processor 604. Processor 604 may be a special purpose or a general purpose processor. Processor 604 is connected to a communication infrastructure 606 (e.g., a bus or network).

Computer system 600 also includes a main memory 608, preferably random access memory (RAM), and may also include a secondary memory 610. Secondary memory 610 can include, for example, a hard disk drive 612, a removable storage drive 614, and/or a memory stick. Removable storage drive 614 can include a floppy disk drive, a magnetic tape drive, an optical disk drive, a flash memory, or the like. The removable storage drive 614 reads from and/or writes to a removable storage unit 618 in a well known manner. Removable storage unit 618 can comprise a floppy disk, magnetic tape, optical disk, etc. which is read by and written to by removable storage drive 614. As will be appreciated by persons skilled in the relevant art, removable storage unit 618 includes a computer-usable storage medium having stored therein computer software and/or data.

In alternative implementations, secondary memory 610 can include other similar devices for allowing computer programs or other instructions to be loaded into computer system 600. Such devices can include, for example, a removable storage unit 622 and an interface 620. Examples of such devices can include a program cartridge and cartridge interface (such as those found in video game devices), a removable memory chip (e.g., EPROM or PROM) and associated socket, and other removable storage units 622 and interfaces 620 which allow software and data to be transferred from the removable storage unit 622 to computer system 600.

Computer system 600 can also include a communications interface 624. Communications interface 624 allows software and data to be transferred between computer system 600 and external devices. Communications interface 624 can include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 618, removable storage unit 622, and a hard disk installed in hard disk drive 612. Computer program medium and computer-usable medium can also refer to memories, such as main memory 608 and secondary memory 610, which can be memory semiconductors (e.g., DRAMs, etc.). These computer program products provide software to computer system 600.

Computer programs (also called computer control logic) are stored in main memory 608 and/or secondary memory 610. Computer programs may also be received via communications interface 624. Such computer programs, when executed, enable computer system 600 to implement embodiments of the present invention as discussed herein. In particular, the computer programs, when executed, enable processor 604 to implement processes of embodiments of the present invention, such as the steps in the methods illustrated by flowchart 500 of FIG. 5, discussed above. Accordingly, such computer programs represent controllers of the computer system 600. Where embodiments of the present invention are implemented using software, the software can be stored in a computer program product and loaded into computer system 600 using removable storage drive 614, interface 620, hard drive 612, or communications interface 624.

Embodiments of the present invention are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by persons skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for texture mapping, the method comprising:
    partitioning a texture and associated mipmaps into memory tiles, wherein the memory tiles are associated with a virtual memory system;
    mapping a first subset of the memory tiles with a first level of detail to respective address spaces in a physical memory system, wherein the mapping further comprises mapping a first memory tile and a second memory tile from the first subset of the memory tiles to the same respective address space in the physical memory system; and
    mapping, in response to an unavailable second level of detail, a second subset of memory tiles having the second level of detail to respective address spaces in physical memory, wherein the second level of detail exceeds the first level of detail.

2. The method of claim 1, further comprising:
    accessing the physical memory system during a rendering process of a graphics scene associated with the first subset of memory tiles; and
    mapping the second subset of memory tiles to respective address spaces in the physical memory system when the rendering process of the graphics scene requires one or more memory tiles outside of the first subset of memory tiles.

3. The method of claim 2, wherein mapping the second subset of memory tiles comprises mapping one or more memory tiles that correspond to mipmaps with a higher level of detail than a level of detail associated with the mipmaps corresponding to the first subset of the memory tiles.

4. The method of claim 1, wherein the partitioning comprises partitioning the texture and associated mipmaps into a memory tile size compatible with a macro tile associated with a texture swizzle pattern of a graphics processing unit.

5. The method of claim 1, wherein the mapping comprises mapping one or more memory tiles to the physical memory system, wherein the one or more memory tiles correspond to mipmaps with a predetermined level of detail.

6. The method of claim 1, wherein the mapping comprises selecting one or more memory tiles in the first subset of the memory tiles based on level of detail information provided by an application module.

7. The method of claim 6, wherein the mapping comprises marking one or more non-selected memory tiles as invalid in a page table associated with the virtual memory system.

8. The method of claim 2, wherein the accessing comprises reporting a failure status code when an access to an unmapped portion of a page table associated with the virtual memory system occurs.

9. The method of claim 8, wherein the reporting comprises reporting a level of detail associated with an unmapped memory tile attempted to be accessed by an application module.

10. A computer program product comprising a non-transitory computer-usable medium having computer program logic recorded thereon that, when executed by one or more processors, performs a texture mapping operation, the computer program logic comprising:
    first computer readable program code that enables a processor to partition a texture and associated mipmaps into memory tiles, wherein the memory tiles are associated with a virtual memory system;
    second computer readable program code that enables a processor to:
        map a first subset of the memory tiles with a first level of detail to respective address spaces in a physical memory system, wherein the second computer readable program code further enables the processor to map a first memory tile and a second memory tile from the first subset of the memory tiles to, the same respective address space in the physical memory system; and
        map, in response to an unavailable second level of detail, a second subset of memory tiles having the second level of detail to respective address spaces in physical memory, wherein the second level of detail exceeds the first level of detail.

11. The computer program product of claim 10, wherein the computer program logic further comprises:
    third computer readable program code that enables a processor to access the physical memory system during a rendering process of a graphics scene associated with the first subset of memory tiles; and
    fourth computer readable program code that enables a processor to map the second subset of memory tiles to respective address spaces in the physical memory system when the rendering process of the graphics scene requires one or more memory tiles outside of the first subset of memory tiles.

12. The computer program product of claim 11, wherein the fourth computer readable program code comprises:
    fifth computer readable program code that enables a processor to map one or more memory tiles that correspond to mipmaps with a higher level of detail than a level of detail associated with the mipmaps corresponding to the first subset of the memory tiles.

13. The computer program product of claim 10, wherein the first computer readable program code comprises:
third computer readable program code that enables a processor to partition the texture and associated mipmaps into a memory tile size compatible with a macro tile associated with a texture swizzle pattern of a graphics processing unit.

14. The computer program product of claim 10, wherein the second computer readable program code comprises:
third computer readable program code that enables a processor to map one or more memory tiles to the physical memory system, wherein the one or more memory tiles correspond to mipmaps with a predetermined level of detail.

15. The computer program product of claim 10, wherein the second computer readable program code comprises:
third computer readable program code that enables a processor to select one or more memory tiles in the first subset of the memory tiles based on level of detail information provided by an application module.

16. A computing system, comprising:
an application module;
an application programming interface;
a driver module;
a processing module configured to:
partition a texture and associated mipmaps into memory tiles, wherein the memory tiles are associated with a virtual memory system;
map a first subset of the memory tiles with a first level of detail to respective address spaces in a physical memory system, wherein the processing module is further configured to map a first memory tile and a second memory tile from the first subset of memory tiles to the same respective address space in the physical memory system; and
map, in response to an unavailable second level of detail, a second subset of memory tiles having the second level of detail to respective address spaces in physical memory, wherein the second level of detail exceeds the first level of detail; and
a display module.

17. The computing system of claim 16, wherein the processing module comprises a processing unit, a memory management unit, and a memory device.

18. The computing system of claim 17, wherein the processing unit comprises a graphics processing unit.

19. The computing system of claim 18, wherein the processing module is configured to:
access the physical memory system during a rendering process of a graphics scene associated with the first subset of memory tiles; and
partition the texture and associated mipmaps into a memory tile size compatible with a macro tile associated with a texture swizzle pattern of the graphics processing unit.

20. The computing system of claim 16, wherein the processing module is configured to map the second subset of memory tiles to respective address spaces in the physical memory system when the rendering process of the graphics scene requires one or more memory tiles outside of the first subset of memory tiles.

21. The computing system of claim 16, wherein the processing module is configured to report a failure status code when an access to an unmapped portion of a page table associated with the virtual memory system occurs.

22. The method of claim 1, further comprising:
updating the mappings based on frequencies of request for the first level of detail and the second level of detail.

\* \* \* \* \*